Aug. 8, 1950        D. D. GRIEG        2,517,558
RADIO OBSTACLE DETECTION SYSTEM
Original Filed Sept. 18, 1942        2 Sheets-Sheet 1
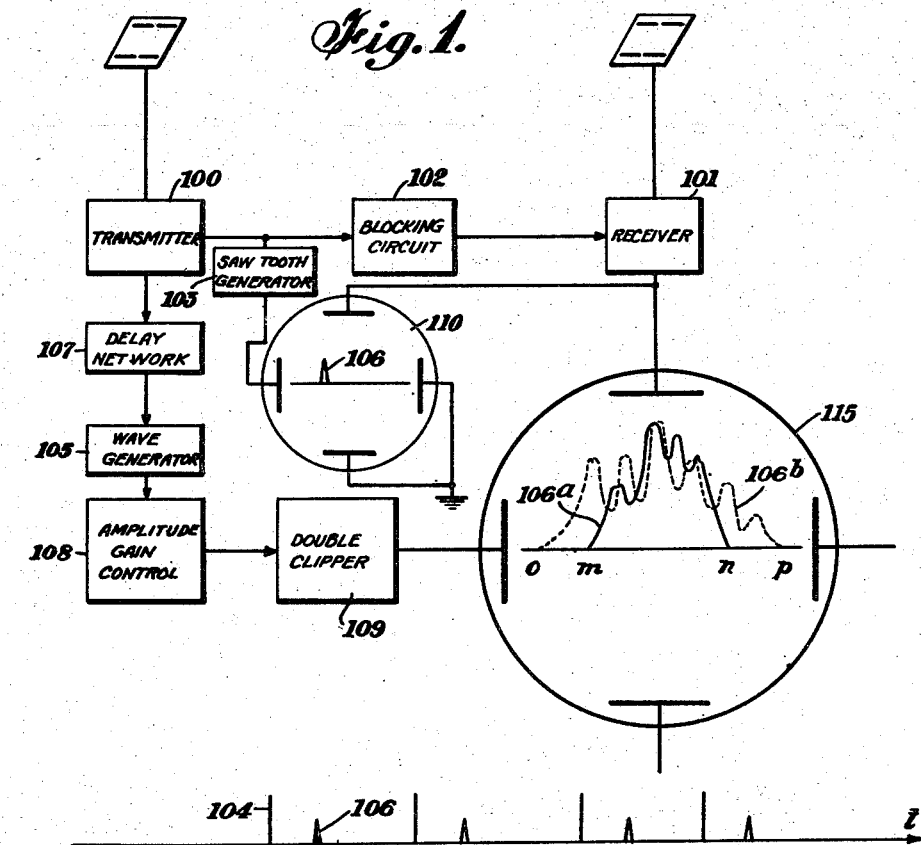
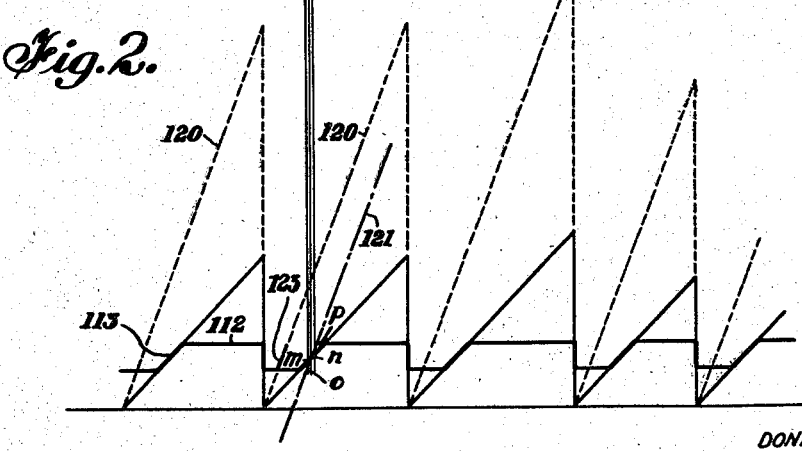
INVENTOR
DONALD D. GRIEG
BY
ATTORNEY

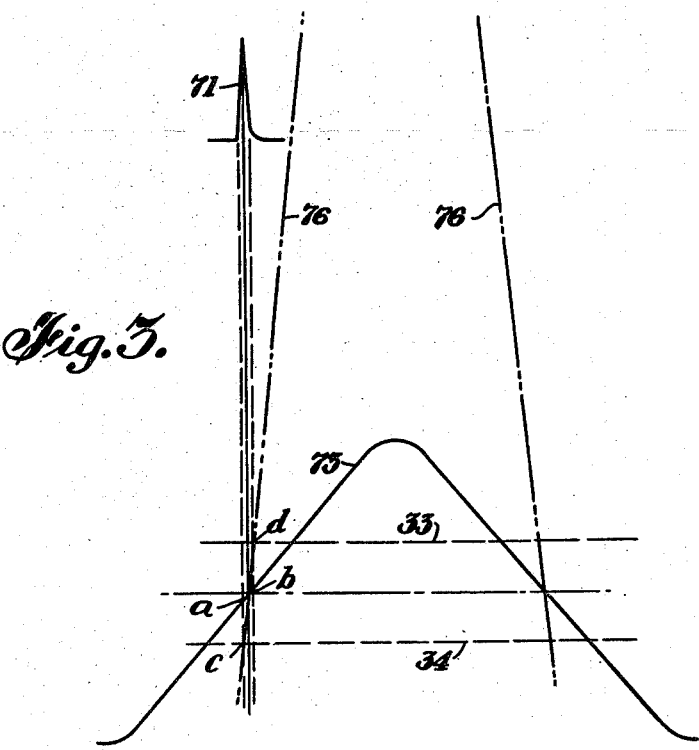
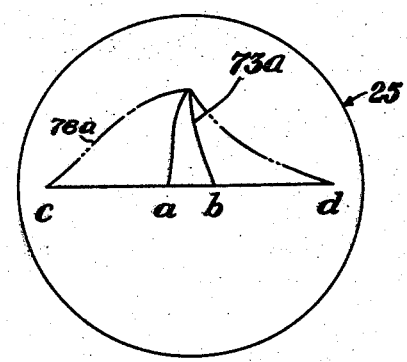

Patented Aug. 8, 1950

2,517,558

UNITED STATES PATENT OFFICE 2,517,558

RADIO OBSTACLE DETECTION SYSTEM

Donald D. Grieg, Forest Hills, N. Y., assignor to Federal Telephone and Radio Corporation, New York, N. Y., a corporation of Delaware Original application September 18, 1942, Serial No. 458,853, now Patent No. 2,440,263, dated April 27, 1948. Divided and this application May 29, 1944, Serial No. 537,835

10 Claims. (Cl. 343—13)

This invention relates to radio obstacle detection systems and more particularly to means for expanding pulse reflections so that the shapes thereof can be easily studied and/or compared with other pulse shapes.

This application is a division of my copending application for Monitoring Circuit, Serial No. 458,853, filed September 18, 1942, which issued April 27, 1948, as Patent No. 2,440,263.

An example of an obstacle detection system is disclosed in the copending application of E. Labin and applicant Serial No. 437,530, filed April 3, 1942, wherein the locations of obstacles are detected by determining their distance and direction with respect to the locating apparatus. The system operates according to the pulse principle wherein ultra high frequency impulses are intermittently radiated and the echo reflections of such radiations are detected for determining the lapse of time and direction to the obstacles causing such reflections.

It is an object of the invention to provide a method and means in connection with obstacle detection systems whereby echo pulses can be greatly expanded for study; and the general character, shape and approximate number of obstacles causing the echo pulse can be determined by a study of the detailed pulse structure.

The method of expanding the outline shape of a pulse as viewed upon the screen of a cathode ray oscillograph involves first the production or the procurement of a wave synchronized to the frequency of pulse occurrence. The wave is preferably of the character having regularly recurring, substantially linear, inclined portions such, for example, as the inclined portions adjacent the zero axis of a sinusoidal wave. The wave thus procured is then subjected to a clipping process such as passing the wave through a double clipper or gate of constant magnitude to thereby segregate a portion between two levels a short distance apart along the inclined portions thereof. The inclined portions thus clipped from the wave are used as the sweep potential for the oscillograph. The pulses to be expanded are applied to the oscillograph at right angles to the sweep potential. The degree of expansion of the pulse depends upon the inclination of the inclined portions of the wave form used as the sweep potential. This inclination may be varied by varying the shape of the wave such as by varying the amplitude thereof prior to the clipping operation, but the clipping of the wave determines the sweep potential for different inclinations of the clipped portions. The inclination of the inclined portions may be such as to expand the pulse which normally would appear as a straight line, the full width of the oscillograph screen and even further. Where the pulse is expanded further than the width of the screen, the structure of either the wave front, the trailing side or the central top portion of the wave may be viewed in greatly magnified proportions. To bring any portion of the expanded pulse for view on the oscillograph, the phase of the wave used can be shifted as desired.

In the case of obstacle detection, a wave may be generated in response to the impulses transmitted instead of by a selected one of the echo pulses. The wave, whether sinusoidal or of the saw-tooth form, is doubly clipped as described above to produce a constant peak amplitude for the inclined wave portions to be used for the sweep potential. The echo pulses received by the detection apparatus are applied at right angles to the sweep potential and the shape of the pulse may be easily determined by adjusting the gain of the wave amplifier used to produce the sweep potential. In this connection, an expansion of the echo pulse will often indicate peculiar irregularities which may correspond to certain irregularities in the shape of an obstacle or the number of obstacles causing the echo. Thus if the obstacle is a battleship having a certain irregular superstructure, this irregularity will, in a sense, appear in the echo pulse shape, especially if the ship is travelling in a direction toward or away from the location of the detection apparatus. In the case of a squadron of airplanes causing the echo pulse, an expansion of the pulse will reveal that it is made up of a number of closely disposed pulses, the number of which can then be determined with a fair degree of accuracy. Thus the approximate number of airplanes in the detected squadron can be determined. It will therefore be clear that by expanding the echo pulses, irregularities caused by the reflecting obstacles may be detached and the general character and quantity of the obstacles determined.

For a further understanding of the invention, reference may be had to the following detailed description to be read in connection with the accompanying drawings, in which Fig. 1 is a schematic block diagram of an obstacle detection apparatus incorporating the principles of this invention;

Fig. 2 is a graphical illustration of transmitted impulses and echo pulses and the relationship thereof with respect to the sweep potential used in the system of Fig. 1.

Fig. 3 is a graphical illustration of a sinusoidal curve wherein the amplitude thereof is varied to indicate the expanding effect of such variation on pulses; and Fig. 4 is a view of the screen of an oscillograph showing a pulse and how it may be expanded to different proportions in accordance with the curves shown in Fig. 3.

Referring to Fig. 1, an obstacle detection system is shown comprising the usual transmitting device 100, a receiver 101, and a blocking device 102 adapted to block operation of the receiver during the transmission of obstacle detecting impulses 104. The system includes the usual cathode ray oscillograph 110 for detection of echo pulses. The sweep potential for the oscillograph 110 may be a known form of saw-tooth generator 103 controlled by the transmission of impulses 104 (Fig. 2).

When an echo pulse 106 appears on the screen of the oscillograph 110 it may be desirable to examine closely the shape structure of the pulse. This is accomplished by using a second or vernier oscillograph 115. The sweep potential therefor is obtained from a wave produced by a generator 105 synchronized by the impulse energy of transmitter 100. The wave is time or phase adjusted by delay unit 107 or by a phase shifter that may be located in the output of the generator 105 in the manner disclosed in Fig. 5 of my aforesaid copending application Serial No. 458,853. The wave is then passed through a known form of amplitude gain control 108 whereby the amplitude of the wave is increased as desired. A double clipper 109 of known form is used for clipping the wave between two desired levels, the portion thus obtained being used as sweep potential for the vernier oscilloscope 115.

The wave produced at 105 may be either sinusoidal, of saw-tooth shape or any other shape having periodic inclined portions. The example shown in Fig. 2 is of saw-tooth shape.

Since the impulses 104 may not be of a steady repetition frequency, the amplitude of the sawtooth may not be constant. This amplitude variation, however, has no effect on the sweep potential since the double clipper 109 provides a constant amplitude wave as indicated by the heavy lines 112 (Fig. 2). Since each saw-tooth is initiated by a transmitter pulse 104, an adjustment of the delay network 107 may be necessary to move the inclined portion 113 of the sweep potential wave 112 into timed relation with the echo pulse 106. For the inclination of the portion 113, an expanded wave shape 106a having a base m—n will appear on the oscillograph 115. If it is desirable to further expand the echo pulse, this may be accomplished by adjusting the gain control 108 to increase the inclination of the inclined portion 113 as indicated by the saw-tooth wave 120. In order to line up the inclined portion 123 of the curve 120 with the echo pulse 106, an adjustment of the delay network 107 is required. This shifted position is indicated by the line 121. The resulting pulse shape 106b is indicated as having a base o—p. The irregularity of the echo pulse shape will depend upon the reflecting surfaces of the obstacle or obstacles, as the case may be.

In order to determine the nature of the obstacle, it will be necessary to send a pulse having a smooth shape. Should the obstacle be a battleship, the irregularity of the superstructure thereof may be detectable from certain irregularities appearing in the pulse shape. Should a squadron of airplanes cause the echo, it will probably show up on the oscillograph 110 as a single pulse 106. By expanding the pulse on oscillograph 115 to the shape 106a, it will be seen that there are a plurality of pulses closely positioned together. By expanding the pulse shape to the size 106b the group of pulses can be separated so that the number of airplanes or other obstacles causing the echo can be determined with a fairly high degree of accuracy. This detection of different types and closely grouped obstacles such as warships and aircraft by their echo reflection will in most instances, of course, require study and comparison with known echo shapes obtained by actual tests.

Referring now to Figs. 3 and 4, the operation of the amplitude gain control 108 will be further described with reference to a sine wave input. As the wave is increased in amplitude as indicated by the curves 73 and 76 it will be observed that the projected width of the pulse 71 on these curves increases in accordance to the steepness of the curve portions. The distance $a$—$b$ for curve 73 represents the portion of the sweep potential which traces the pulse shape 73a on the screen of the oscillograph 25 (Fig. 4). The distance $c$—$d$ on the curve 76 results in the pulse shape being expanded as indicated by the dot-dash line 76a.

From the foregoing, it is clear that the pulse shapes may be greatly expanded by increasing the amplitude of the wave whether it is a sine or sawtooth wave, which provides the sweep potential. It will be understood that the examples shown do not cover the extremes of the shape expansion feature of the invention but that the amplitude may be further increased so as to expand any desired portion of a pulse the full width of the oscillograph screen.

While I have shown and described a particular circuit arrangement, it will be understood that it is to be regarded as illustrative of the invention only and not as restricting the appended claims.

I claim:

1. A method of expanding an echo pulse produced on the screen of an oscillograph by the presence of an obstacle in response to the transmission of recurring impulses comprising forming a sweep potential for the oscillograph by application of delayed energy of the recurring impulses to initiate a wave having recurring inclined portions in synchronism with the repetition rate of said impulses, clipping the wave at two voltage levels to obtain inclined portions thereof in a desired timed relation with respect to the occurrence of said impulses, applying the inclined energy portions of the clipped wave as sweep potential for the oscillograph, and controlling the inclination of the inclined portions to obtain a desired degree of expansion of the echo pulse formed on the screen.

2. A method according to claim 1 wherein the operation controlling the inclination of said inclined portions includes the step of controlling the amplitude of said wave according to the inclination desired.

3. A method according to claim 1 wherein the operation controlling the inclination of said inclined portions includes the step of controlling the shape of said wave to give said inclined portions thereof the desired inclination.

4. In obstacle detection system having means to transmit recurring original impulses and means to receive echo pulses caused by the presence of an obstacle in response to the transmitted impulses, said responding pulses being received with a significant delay in time with respect to the originating pulses, the combination therewith of a cathode ray oscillograph to which the responding pulses are applied, means to produce a wave in synchronous relation with respect to the transmission of said impulses, said wave having recurring substantially linear inclined portions, means for delaying said wave in accordance with the delay of said echo pulses, means to clip the wave at two voltage levels to obtain a part of the inclined portion thereof, and means to apply the wave parts thus obtained as sweep potential for the oscillograph, the inclination of said inclined portions determining the degree of expansion of the pulse shape of the echo pulse appearing on the oscillograph.

5. An obstacle detection system according to claim 4 in combination with means to control the amplitude of the wave which changes the inclination of said inclined portions and thereby varies the degree of expansion of the pulse shape appearing on the oscillograph.

6. In obstacle detection system having means to transmit recurring impulses and means to receive echo pulses caused by the presence of an obstacle in response to the transmitted impulses, the combination therewith of a cathode ray oscillograph to which the echo pulses are applied, means to produce a wave in synchronous relation with respect to the reception of a particular echo pulse occurring in response to the transmission of each of said impulses including energy delay means, said wave having recurring substantially linear inclined portions, means to clip said wave at two voltage levels on the inclined portion to provide sweep potentials spaced in time with respect to said impulse transmission for coincidence with reception of said particular echo pulse, and means to apply the sweep potentials to the oscillograph, the inclination of said inclined portions determining the degree of expansion of the pulse shape of said particular echo pulse.

7. An obstacle detection system according to claim 6 further including means for controlling the shape of said wave to give the inclined portions thereof the desired inclination.

8. An obstacle detection system according to claim 6 further including means for controlling the amplitude of said wave according to the inclination desired.

9. In an obstacle detection system having means to transmit recurring impulses, means including a panoramic oscillograph to receive and indicate echo pulses caused by the presence of obstacles in response to said impulses, the combination therewith of a pulse shape detecting oscillograph, means to apply the received echo pulses to said shape detecting oscillograph for examination of the shapes thereof, means to produce a wave in timed relation with respect to the transmission of said impulses, said wave having recurring substantially linear inclined portions, means to pass the wave through a gate of constant magnitude thereby clipping the wave along two levels spaced a short amplitude interval apart and so disposed as to include a corresponding part of the recurring inclined portions, means to apply the clipped parts thus obtained as sweep potential to the shape detecting oscillograph, the inclination of said inclined portions determining the degree of expansion of the pulse shapes appearing on said shape detecting oscillograph, and means for shifting the phase of said wave form to bring the inclined portions thereof in timed relation with a selected echo pulse appearing on the panoramic oscillograph so that the pulse shape thereof will appear along the sweep line of the shape detecting oscillograph.

10. In an obstacle detection system having means to transmit recurring impulses, means to receive echo pulses caused by the presence of an obstacle in response to the transmitted impulses, and means including a panoramic oscillograph to receive and indicate echo pulses caused by the presence of obstacles in response to said impulses, the combination therewith of a cathode ray pulse-shape detecting oscillograph, means to apply the received echo pulses to said shape detecting oscillograph for examination of the shapes thereof, means to produce a wave in timed relation with respect to the transmission of said impulses, said wave having recurring substantially linear inclined portions, means to pass the wave through a gate of constant magnitude thereby clipping the wave along two levels spaced a short amplitude interval apart and so disposed as to include a corresponding part of the recurring inclined portions, means to apply the clipped parts thus obtained as sweep potential to the shape detecting oscillograph, the inclination of said inclined portions determining the degree of expansion of the pulse shapes appearing on said shape detecting oscillograph, means for shifting the phase of said wave form to bring the inclined portions thereof in timed relation with a selected echo pulse appearing on the panoramic oscillograph so that the pulse shape thereof will appear along the sweep line of the shape detecting oscillograph, and means for controlling the amplitude of said wave to obtain a desired inclination for said inclined portions.

DONALD D. GRIEG.

REFERENCES CITED

The following references are of record in the file of this patent:

UNITED STATES PATENTS

| Number | Name | Date |
|---|---|---|
| 2,059,004 | Leeds | Oct. 27, 1936 |
| 2,143,035 | Smith | Jan. 10, 1939 |
| 2,227,598 | Lyman et al. | Jan. 7, 1941 |
| 2,300,109 | Wolff | Oct. 27, 1942 |
| 2,344,745 | Somers | Mar. 21, 1944 |
| 2,355,363 | Christaldi | Aug. 8, 1944 |
| 2,368,448 | Cook | Jan. 30, 1945 |
| 2,368,449 | Cook | Jan. 30, 1945 |
| 2,373,145 | Sensiper et al. | Apr. 10, 1945 |